(12) United States Patent
Borri et al.

(10) Patent No.: US 10,996,159 B2
(45) Date of Patent: May 4, 2021

(54) ANALYSING NANO-OBJECTS

(71) Applicant: University College Cardiff Consultants Limited, Cardiff (GB)

(72) Inventors: Paola Borri, South Glamorgan (GB); Wolfgang Werner Langbein, South Glamorgan (GB); Attilio Zilli, Milan (IT); Lukas Menezes Payne, South Glamorgan (GB)

(73) Assignee: University College Cardiff Consultants Limited, Cardiff (GB)

( * ) Notice: Subject to any disclaimer, the term of this patent is extended or adjusted under 35 U.S.C. 154(b) by 0 days.

(21) Appl. No.: 16/633,519

(22) PCT Filed: Jul. 19, 2018

(86) PCT No.: PCT/GB2018/052039
§ 371 (c)(1),
(2) Date: Jan. 23, 2020

(87) PCT Pub. No.: WO2019/020975
PCT Pub. Date: Jan. 31, 2019

(65) Prior Publication Data
US 2020/0232903 A1 Jul. 23, 2020

(30) Foreign Application Priority Data
Jul. 24, 2017 (GB) .................................. 1711886

(51) Int. Cl.
*G01N 15/14* (2006.01)
*G01N 15/00* (2006.01)
(52) U.S. Cl.
CPC . *G01N 15/1475* (2013.01); *G01N 2015/0038* (2013.01)

(58) Field of Classification Search
CPC ............... G01N 15/14; G01N 15/1475; G01N 2015/0038
(Continued)

(56) References Cited

U.S. PATENT DOCUMENTS

| 7,027,238 B2 * | 4/2006 | Weiss | G02B 21/06 359/385 |
| 7,057,732 B2 * | 6/2006 | Jorgenson | B82Y 15/00 356/445 |

(Continued)

FOREIGN PATENT DOCUMENTS

| WO | 2004048970 A1 | 6/2004 |
| WO | 2004102160 A2 | 11/2004 |

(Continued)

OTHER PUBLICATIONS

Wang, Gufeng et al; "Imaging and Spectroscopic Analysis of Living Cells"; Methods in Enzymology, 2012; https://www.sciencedirect.com/topics/medicine-and-dentistry/bright-field-microscopy.*

(Continued)

*Primary Examiner* — Roy M Punnoose
(74) *Attorney, Agent, or Firm* — MLO, a professional corp.

(57) ABSTRACT

Methods and apparatus for analysis of nano-objects using wide-field bright field transmission techniques are described. Such methods may comprise acquiring a plurality of images of a sample comprising a plurality of nano-objects using bright field illumination via a continuously variable spectral filter, and identifying a nano-object within the sample in the plurality of images, wherein the position of the nano-object changes between images. Using data extracted from the plurality of images, an extinction cross-section of the identified nano-object may be quantitatively determined.

27 Claims, 4 Drawing Sheets

(58) Field of Classification Search
USPC .......................................................... 356/338
See application file for complete search history.

(56) References Cited

U.S. PATENT DOCUMENTS

| | | | | |
|---|---|---|---|---|
| 7,221,457 | B2* | 5/2007 | Jorgenson | B82Y 15/00 356/445 |
| 2003/0011910 | A1* | 1/2003 | Weiss | G02B 21/06 359/891 |
| 2005/0046840 | A1 | 3/2005 | Kusuzawa | |
| 2008/0079830 | A1 | 4/2008 | Lepage | |
| 2013/0027770 | A1 | 1/2013 | Ganser et al. | |

FOREIGN PATENT DOCUMENTS

| | | |
|---|---|---|
| WO | 2011014282 A3 | 3/2011 |
| WO | 2014191003 A1 | 12/2014 |
| WO | 2017143332 A1 | 8/2017 |

OTHER PUBLICATIONS

Husnik, et al., Quantitative Experimental Determination of Scattering and Absorption Cross-Section Spectra of Individual Optical Metallic Nanoantennas, Physical Review Letters, Dec. 4, 2012, 5 pgs, New York.

Payne, et al., Optical micro-spectroscopy of single metallic nanoparticles: Quantitative extinction and transient resonant four-wave mixing, May 29, 2015, 17 pgs, vol. 1-16, The Royal Society of Chemistry, Cardiff, United Kingdom.

Payne, Optical extinction and coherent multiphoton micro-spectroscopy of single nanoparticles, Cardiff School of Biosciences, Dec. 3, 2015, 209 pgs, Cardiff, United Kingdom.

Pope, et al., Coherent anti-Stokes Raman scattering microscopy of single nanodiamonds, Oct. 12, 2014, 7 pgs, vol. 9, Macmillan Publishers Limited.

Search report for United Kingdom Application No. GB1711886.0 dated Jan. 19, 2018.

Zilli et al., Quantitative Microscopy of Single Nanoparticles, Cardiff University, School of Biosciences and School of Physics and Astronomy, 1 pg. 2013. Publicly disclosed Sep. 11, 2016.

Zilli, Measuring the Absolute Optical Cross Sections of Nano-Objects, Cardiff University, Jul. 7, 2017, 14 pgs. Cardiff, United Kingdom.

Zilli, Presentation—Cross Sections, Photon 16 Leeds, Sep. 6, 2016, 2 pgs.

Harvey et al: "Birefringent Fourier-transform imaging spectrometer", Optics Express, OSA Publishing, US, vol. 12, No. 22, Nov. 1, 2004 (Nov. 1, 2004), pp. 5368-5374.

Payne et al: "Polarization-resolved extinction and scattering cross-sections of individual gold nanoparticles measured by wide-field microscopy on a large ensemble", Applied Physics Letters, AIP Publishing LLC, US, vol. 102, No. 13, Apr. 1, 2013 (Apr. 1, 2013), pp. 131107-131107, [retrieved on Apr. 4, 2013].

Written Opinion of the International Searching Authority dated Oct. 19, 2018 for PCT Patent Application No. PCT/GB2018/052039.

* cited by examiner

ANALYSING NANO-OBJECTS

FIELD OF INVENTION

The present invention relates to methods of analysing nano-objects, in some examples using wide-field illumination techniques.

BACKGROUND

In some examples, a nano-object may be an object with at least one dimension smaller than the wavelength of interrogating light, which may be around 1 micron. In some examples, the method of analysis of nano-objects is a method of analysis of nanoparticles. Nanoparticles are objects with all dimensions of about 100 nm or less. The term nano-object may be used to refer to objects with at least one dimension of about 100 nm or less, and can include, for example, lithographic structures or carbon nanotubes, and nano-particles.

In wide-field microscopy, a sample may be illuminated with light having a relatively broad spectrum and the transmission of the light through the sample is observed. However, for some types of samples, such techniques may suffer from low contrast.

The interaction of light with different classes of nano-objects is an active area of research. Nanoplasmonics is a discipline studying the optical properties of metallic nano-objects, in which the localized surface plasmon resonance (LSPR), corresponding to an enhanced coupling between the light field and the nano-object resulting in a strong field localization close to the nano-object surface may be considered. Nano-objects are currently the subject of research for numerous applications, including local dielectric sensing, labelling for microscopy, drug delivery, and in-vitro diagnostics. In the case of metallic nano-objects, they are also being used as surface enhanced Raman spectroscopy (SERS) substrates, and for photothermal therapy.

Such applications may rely on properties linked to the size and shape of the nano-objects. For example, the strong field enhancement in the metallic particle nearfield which occurs at the localised surface plasmon resonance frequency is related to the resonance frequency, amplitude and linewidth which in turn depend with high sensitivity on the particle size, shape and local environment.

Therefore, determining particle size and shape is an important field of research. However, current techniques for particle characterisation may be inaccurate, time consuming and/or expensive.

Particular efforts have been made in developing techniques to determine cross-sections of nano-objects (where cross sections can include scattering, absorption and/or extinction cross sections) as a function of frequency, which together describe the interaction of a particle with electromagnetic radiation. However, cross-section values—especially for scattering—can be difficult to quantify experimentally. Currently available approaches tend to be complex and are generally suited to academic, rather than commercial, environments (an example may include laser-based techniques such as spatial modulation spectroscopy). Some techniques, such as dark-field micro-spectroscopy, do not provide quantitative results and as such scattering cross-sections of nano-objects are rarely measured quantitatively and results are typically presented in arbitrary units.

In general, the measured cross-section of a nano-object depends on the size, shape and environment. This dependence is particularly sensitive in the case of metallic nano-objects, whose different LSPR modes result in large and spectrally and polarization dependent cross-sections. Thus fitting theory and numerical results to the measured cross-section can provide an estimate of the geometric parameters of the nano-objects.

SUMMARY OF THE INVENTION

In examples of the invention described herein, micro-spectroscopy methods and apparatus are described which may be utilised to measure the absolute values of the cross-sections (for example the scattering, absorption and/or extinction cross-section) of a nano-object (which may be for example metallic or dielectric). Examples may use a microscope, which may be a wide-field microscope, equipped with a broadband lamp, camera(s) and/or spectrometer(s) to obtain images of a sample. In some examples, the shapes of the nano-objects may be determined.

According to a first aspect of the invention, there is provided a method of analysis of nano-object attributes using wide-field transmission techniques comprising:
  (i) acquiring a plurality of images of a sample comprising a plurality of nano-objects using bright field illumination via a continuously variable spectral filter;
  (ii) identifying a nano-object within the sample in the plurality of images, wherein the position of the nano-object changes between images; and
  (iii) quantitatively evaluating an extinction cross-section for the identified nano-object using data extracted from the plurality of images.

In some examples, the nano-object extinction cross-section and the depolarization cross-section are measured. In some examples, the illumination may be polarization resolved and/or spectrally resolved. In some examples, the illumination may be incoherent illumination. For example, the illumination and/or acquisition of images may be polarisation-resolved and the method may comprise determining, quantitatively, for the identified object, using data extracted from the plurality of images, a polarisation-resolved extinction cross-section. In some examples, the illumination and acquisition of images may be polarisation-resolved, and a polarisation-resolved depolarisation cross-section may be determined.

The continuously variable spectral filter may be arranged before or after the sample optically (i.e. in the direction of travel of the illumination). In some examples, at least two continuously variable spectral filters may be provided, at least one being provided (optically) on either side of the sample. Such a filter may provide spectral non-locality of the measurements, separating elastic scattering from inelastic scattering. In some examples, the spectral resolution can be adjusted continuously by changing the scan range, with higher resolution leading to an increase in measurable points. In other examples of filters, (for example for wedged multilayer filters) the spectral resolution may be fixed, and the centre wavelength may be varied.

In such a method, the change of light transmission, or extinction, due to a particle may be measured. As the particle is in a different position between the images, a measurement may be made of a location with the particle and absent the particle, in some examples by comparing the same pixel of the sensor between images.

The position of the nano-object may change in a controlled or uncontrolled manner. In some examples, nano-objects are suspended in a carrier fluid (for example suspended in water, glycerol, ethanol, isopropanol, or another carrier fluid) and may move positions between images being acquired under Brownian motion. As used herein the term 'suspend in' is used to refer to a mixture and includes suspensions and colloids. In other examples, the nano-objects may be in a fixed position on a substrate which is shifted between images being acquired. For example, a sample of nano-objects may be drop-cast on a coverslip and mounted on a microscope slide, and the slide may be shifted between images being acquired.

In some examples, an optical resolution for imaging may be selected so as to be capable of measuring a transmission change over an area of about $\lambda^2$, where A is the wavelength of the illuminating light in the sample medium such as a carrier fluid (for example, an area A of about 0.1 $\mu m^2$ in the visible wavelength range in water).

The sensitivity of extinction measurements is fundamentally limited by the photon statistics to a signal-to-noise ratio (SNR) of $1/\sqrt{N}$, where N is the number of detected photons (shot noise limit). For a typical imaging sensor such as a CMOS camera at the time of writing, the full well capacity is typically about $N_{FW}=10^4$ photons per pixel per readout, with an example readout/frame rate of $f_R=200$ Hz, and at Nyquist sampling there are about $N_P=16$ pixels per area A. This results in an estimated sensitivity of $A/\sqrt{(N_{FW}*f_R t*N_P)}$ of about 18 nm$^2$ for a total exposure measurement time of t=1 second. This value corresponds to the extinction cross-section of a 7 nm diameter (D) gold nanosphere particle (GNP) at its plasmon resonance frequency in water. By setting t, $f_R$ and $N_P$ appropriately, a sensitivity of $\sigma_{ext}\approx 1$ nm$^2$ can be achieved using currently readily available imaging apparatus, corresponding to a GNP diameter of about 2.6 nm.

The method may further comprise illuminating a sample comprising a plurality of nano-objects using dark field illumination techniques, imaging scattered radiation and determining a scattering cross-section. In other words, in some examples, in conjunction with the bright field transmission imaging which is used to determine the particle extinction cross-section and in some examples depolarization cross-section, scattering of dark field images can also be imaged to determine a scattering cross-section. Such methods may comprise acquiring a plurality of images and determining at least one correction factor related to the optical geometry and combining such factor(s) with a plurality of dark-field images and the plurality of bright field images of the same nano-object.

While it is feasible to determine a quantitative measurement of the extinction cross section without dark field imaging (for example in cases in which scattering is negligible, for example small gold nanoparticles less than 20 nm, by using models to estimate scattering, and/or by using the dependence of the extinction image of the nano-object on defocusing), the use of dark field illumination techniques allows the scattering cross-section to be determined directly using scattered radiation. This in turn may be used to quantitatively determine the extinction cross section, as is set out below.

In some examples the bright field and dark field illumination and measurements may be carried out as a separate process, for example by changing the directional range of the illumination from bright field to dark-field. However, in at least some embodiments, the same illumination source may be used in some examples.

In other words, in some examples, the method may comprise using different illumination modalities, i.e. bright-field and dark-field illumination modalities. In bright-field imaging, the illumination is transmitted to the detector, while in dark-field imaging, it is partially blocked so that only scattered light is collected. For example, this can be achieved by using suitable aperture stops, which for example may be mounted on a slider and/or motorized to facilitate switching between the two modalities. In another example, aperture stops may be placed in the back focal plane of the condenser lens in a 'Köhler illumination configuration'.

Dark field imaging is in principle background free and thus has a higher contrast than bright field imaging. The scattering cross-section is measured using dark-field imaging whereas the extinction cross-section is measured using bright-field imaging. The dark-field intensity scales, as does the scattering cross-section, with the square of the particle volume (in the small particle limit, $D \ll \lambda$), while the extinction cross-section measured in bright-field imaging scales with the particle volume (for particles with absorption). In practice, this limits the dynamic range of particle sizes measurable in dark-field.

It is not straightforward to measure absolute scattering cross-sections using dark field microscopy, because the illuminating light is not collected along with the signal and only some fraction of the total scattering falls into the collection range. In some examples herein, however, correction factors related to the optical geometry are calculated and combined with a set of dark-field images and a set of bright field images of the same nano-object, allowing both scattering and absorption cross-section to be extracted quantitatively.

To consider this in more detail, the extinction cross section as measured under bright-field illumination comprises a scattering contribution and an absorption contribution. Dark-field analysis provides information in relation to scattering alone, but only a fraction of the total scattering falls within the collection range of the detector. Nonetheless, the two measurements together can provide sufficient information to compute the scattering and absorption cross-sections.

For example, the extinction cross-section may be calculated by integrating the extinction image obtained under bright-field illumination over an area containing the nano-object image, and the contribution of the forward scattering collected by the detector may be calculated from the dark-field measurement on the same object and subtracted. The resulting value may be referenced to the exciting intensity (i.e. the intensity of the illuminating radiation), and rescaled to take into account that only a fraction of the exciting power may form the image, e.g. because one or more interfaces are present. The scattering cross-section may be calculated by integrating the scattering image obtained under dark-field illumination over an area containing the nano-object image in full, and a background contribution may be measured from a close-by position and subtracted. The resulting value may be referenced to the exciting power over the integration area, and rescaled to take into account that: (i) The exciting power may be different in bright-field and in dark-field; (ii) Only a fraction of the exciting power may be transmitted to the nano-object, e.g. because one or more interfaces are present; (iii) Only a fraction of scattered power is collected by the detector.

In other words, in some examples, in order to separate the scattering and absorption contribution to obtain the extinction cross section, and thus measure the scattering and extinction cross-sections (and indeed the absorption cross section) quantitatively, the data may be analysed by taking into account the geometry of the illumination and detection used for the measurement, and a mathematical or numerical model describing the scattering of the nano-object.

As an example of how this analysis could be carried, the model may comprise the following definitions of the absolute values of the absorption cross-section $\sigma_{abs}^{BF}$ and of the scattering cross-section $\sigma_{sca}^{DF}$:

$$\sigma_{abs}^{BF} = A\tau \left( S_{lamp} - S_{BF} - \zeta \frac{1-f_{BF}}{f_{DF}}(S_{DF} - S_{back}) \right) / S_{lamp}$$

$$\sigma_{sca}^{DF} = A\tau \frac{\xi}{f_{DF}}(S_{DF} - S_{back}) / S_{lamp}$$

Four signals (S) are measured for each nano-object:
$S_{BF}$ is the extinction signal measured under bright-field illumination at the position of the nano-object (which may be obtained for the images acquired under bright-field illumination)
$S_{DF}$ is the scattering signal measured under dark-field illumination at the position of the nano-object
$S_{lamp}$ is the extinction signal measured under bright-field illumination at an 'empty' position close to the nano-object (i.e. one or more pixel which does not contain a nano-object) (local illumination)
$S_{back}$ is the scattering signal measured under dark-field illumination at an empty position close to the nano-object (local background)
A is the area of the sample upon which the above signals are measured. These signals may be a function of the excitation frequency when spectrally-resolved measurements are performed.

The parameters appearing in the above formulas are defined as follows:
τ is the fraction of incident power transmitted from the illumination to the detection medium under bright-field illumination
ξ is the ratio of the power incident on the sample under bright-field to dark-field illumination
ζ is the ratio of the power scattered by the nano-object under bright-field to dark-field illumination
$f_{BF}$ and $f_{DF}$ are the fractions of the total scattered power collected by the detector under bright-field and dark-field illumination, respectively The parameters τ and ξ may be analytical functions of the specifications of the apparatus only (and not depend on the specific nano-objects being measured).

An example of the expression of τ may be the average of the transmittance of a planar interface, e.g. glass and water, with the illumination from the glass side and the nano-objects on the water side, over the angular range of bright-field excitation, upon which the illumination is measured, for example:

$$\tau = \langle T \rangle_{BF} = \frac{\int_{\underline{\theta}_{DF}}^{\overline{\theta}_{BF}} [T_p(\theta_i) + T_s(\theta_i)] \cos\theta_i \sin\theta_i d\theta_i}{2\int_{\underline{\theta}_{DF}}^{\overline{\theta}_{BF}} \cos\theta_i \sin\theta_i d\theta_i}$$

where $T_p$ and $T_s$ are the transmittance of the interface for a p-polarized and an s-polarized plane wave, respectively. The $\cos\theta_i$ weights may be included in the integral to account for an aplanatic lens focusing the illumination. According to both its definition and its expression above, i=1 for measurements in a homogeneous environment.

An example of the expression of ξ may be ratio of the illuminated area in the back-focal plane of an aplanatic lens focusing the illumination, for example:

$$\xi = \frac{A_{ill}^{BF}}{A_{ill}^{DF}} = \frac{\pi \overline{\rho}_{BF}^2}{\pi \overline{\rho}_{DF}^2 - \pi \underline{\rho}_{DF}^2} = \frac{\overline{NA}_{BF}^2}{\overline{NA}_{DF}^2 - \underline{NA}_{DF}^2}$$

which may be expressed (as in the last equality) in terms of the numerical aperture of any light stop(s) defining the bright-field and the dark-field illumination.

The parameters ζ and $f_{BF}$ and $f_{DF}$ may depend additionally on the scattering properties of the measured nano-objects. In general, they can be computed by numerically simulating the scattering process for a model nano-object representing a typical geometry and environment of the measured nano-objects. However, an analytical calculation of ζ, $f_{BF}$, and $f_{DF}$ is also possible under some simplifying assumptions. One set of such an assumptions may be for example:
1. The illumination is provided by an incoherent source (e.g. an incandescent filament)
2. The illumination intensity is homogeneous over the back focal plane of the lens focusing the illumination onto the sample (e.g. by using a suitable light diffuser)
3. The illumination is focused onto the sample by an aplanatic lens (e.g. the condenser of a microscope)
4. The studied nano-objects are small enough (D<<λ) that the scattering is dominated by dipolar terms, and
5. The polarizability of the studied nano-objects is approximated well by a diagonal tensor (e.g. for non-chiral nano-objects having simple geometries)

Under such assumptions, the powers appearing in the definitions of ζ, $f_{BF}$, and $f_{DF}$ $$\zeta = \frac{P_{det}(\underline{\theta}_{BF}, \overline{\theta}_{BF}, 0, \pi)}{P_{det}(\underline{\theta}_{DF}, \overline{\theta}_{DF}, 0, \pi)} \quad f_i = \frac{P_{det}(\underline{\theta}_i, \overline{\theta}_i, \theta_{obj}, \pi)}{P_{det}(\underline{\theta}_i, \overline{\theta}_i, 0, \pi)}$$

may be calculated by integrating the angular distribution P of the power scattered by an electric dipole p over the angular range of illumination subscript), corresponds to either bright-field (DF) or bright-field (DF) illumination extrema) and detection (c subscript), and P the scattered power by the nano-object as function of the incident and scattering angles $$P_{det}(\underline{\theta}_i, \overline{\theta}_i, \underline{\theta}_d, \overline{\theta}_d) \propto$$

$$\int_{\underline{\theta}_i}^{\overline{\theta}_i} \cos\theta_i \sin\theta_i d\theta_i \int_0^{2\pi} d\varphi_i \int_{\underline{\theta}_d}^{\overline{\theta}_d} \sin\theta d\theta \int_0^{2\pi} d\varphi p^2(\theta_i, \varphi_i)_s^{r\,t^3}(\theta_i, \varphi_i, \theta, \varphi).$$

The dipole $p = \overline{\overline{\alpha}} E_{exc}$ is excited at the nano-object position and its amplitude and orientation depends on the polarizability tensor $\overline{\overline{\alpha}}$ describing the nano-object as well as on the exciting electric field $E_{exc}$. Expressions of P for a dipole near a dielectric interface are known (for example from W. Lukosz, J. Opt. Soc. Am. 69, 1495 (1979), DOI: 10.1364/JOSA.69.001495) and may allow to use the analytical approach outlined above to the case of nano-objects placed on a substrate (e.g. a microscope slide).

In some simple cases, the integral above, and hence the definitions of ζ, $f_{BF}$ and $f_{DF}$, may be reduced to a closed form. An example of such expressions for a homogeneous optical environment and a nano-object having a uniaxial polarizability perpendicular to the optical axis of the illumination is set out below: This could represent for instance the longitudinal resonance of an elongated nano-object or the coupled mode of a dimer. In this case, one has $$L_{exc}(\psi) \propto \int_{\theta_i}^{\overline{\theta}_i} \cos\theta_i \sin\theta_i d\theta_i \left\{ \cos^2\theta_i + 1 + \frac{\cos2\psi}{2}(\cos\theta_i + 1)^2 \right\} =$$

$$\left[ \frac{\cos^4\theta_i}{4} + \frac{\cos^2\theta_i}{2} + \frac{\cos2\psi}{2}\left( \frac{\cos^4\theta_i}{4} + 2\frac{\cos^3\theta_i}{3} + \frac{\cos^2\theta_i}{2} \right) \right]_{\overline{\theta}_i}^{\theta_i};$$

where ψ is the angle with respect to the polarizability direction of the exciting polarization in the back-focal plane of the lens focusing the illumination (e.g. defined by a polarizing element inserted in the excitation path). ζ may then be calculated as:

$$\zeta = \frac{L_{exc}(\theta_{BF}, \overline{\theta}_{BF})}{L_{exc}(\theta_{DF}, \overline{\theta}_{DF})}$$

In this case, where the orientation of the excited dipole is fixed along the polarizability direction regardless of the polarization of the exciting field, one has $f_{BF} = f_{DF} = f$ and $$f = L_{det}(0, \alpha_{obj})$$
$$= \int_0^{\alpha_{obj}} \sin\theta_2 d\theta_2 \int_0^{2\pi} d\varphi \frac{3}{8\pi} \{\cos^2\theta_2 \cos^2\varphi + \sin^2\varphi\}$$
$$= \frac{1}{8}(4 - 3\cos\alpha_{obj} - \cos^3\alpha_{obj}).$$

with the maximum emission angle $\alpha_{obj}$ collected (sin($\alpha_{obj}$) n=NA).

In some examples (for example when the particle shape is known and the size is to be determined), the method may comprise comparing the determined cross-section(s) to at least one predetermined model to identify a size of a nano-object within the sample. For example, in the case of sphere, a model from Mie theory which calculates cross-sections as a function of size (sphere radius). Other models may be used for other shapes.

In some embodiments, the method may further comprise determining an optical anisotropy of nano-objects based on the dependence of the cross-sections on the polarization of the illumination. In such examples, the method may further comprise comparing the determined optical anisotropy to at least one predetermined shape model to identify a shape of a nano-object within the sample. For example, the predetermined shape model may have been determined by measuring nano-objects of known shape and determining the characteristics thereof, or determined theoretically. The shape may for example be categorised as a sphere, a rod, a disc or the like.

The anisotropy of nano-objects can be determined by analysing the dependence of the cross-sections on the polarization of the illumination and/or the polarization of the detected light forming the images. Using suitable modelling techniques (e.g. analytical for simple shapes, such as spheroids for D much smaller than λ, and numerically in other examples), the particle size and shape in terms of the parameters of the shape model can be determined by solving the inverse problem. Related techniques are discussed in Faraday Discussions 2015 DOI: 10.1039/c5fd00079c, section 2.2.

In some examples, as noted above, the method may comprise immobilizing nano-objects on a substrate and moving the substrate relative to the imaging apparatus to acquire the plurality of images. For example, a substrate may be shifted laterally by approximately one or two optical resolutions, and the ratio of the shifted and unshifted image may provide an extinction image which may be analysed to analyse the particle-induced transmission change and in turn determine the extinction cross-section. This supresses longer range variations, but short-range roughness on the scale of the shift may be evident. The sample position can be modulated alternating between two or more shift values, so to avoid the effect of thermal drifts over long exposure times.

As also noted above, in other examples, the nano-objects are in suspension in a carrier fluid. Methods for measuring nano-objects in a fluid may be convenient for a user and may enable high throughput particle analysis. This could ease instrument operation, because chemically-grown nano-objects are generally supplied as a suspension or colloid, and immobilizing the nano-objects on a substrate requires further processing of the nano-objects in such cases. In some examples the contamination of fluids, e.g. water, with nanoparticles might be of interest. Moreover, in carrying out analysis methods, the substrate may be static while the nano-objects in suspension are subject to Brownian motion and movement of the nano-objects means that they move in and out of imaging pixels and/or focus and therefore 'short range roughness' as described above may be avoided. While the movement of the nano-objects provides advantages, significant and rapid shifts in position between images can complicate measurements. For example, particle tracking becomes complicated and individual nano-objects may move out of the field of view altogether. This may limit the time to acquire a signal and therefore analysis of faster moving nano-objects may suffer in terms of SNR.

In some examples, the method may comprise diluting a sample so as to provide a threshold concentration which is low when compared to the number of imaging pixels acquired. For example, the concentration may be controlled such that it is significantly more likely that an imaging pixel is empty of a nano-object when an image is obtained than that the imaging pixel contains an image of a nano-object.

As noted above, nano-objects in suspension may diffuse in and out of focus, and may therefore be tracked in three dimensions (e.g. using astigmatic imaging for the axial direction). In some such examples, images may be acquired at a rate to allow such tracking (for example at frame rates between 100 and 1000 Hz). In some embodiments, the suspension may be formulated such that a given point of the image will, at most instances, be empty of a nano-object (this may for example be achieved by diluting a sample as noted above)). This provides empty space which can be used as a reference for the image(s) acquired when the location does contain a nano-object. 3D tracking allows determining the diffusion traces and therefore the hydrodynamic radius of the nano-object, giving an independent alternative measure of the nano-object size. In some examples, therefore, the method may comprise tracking a nano-object in three dimensions, determining a diffusion trace and, based on the diffusion trace, determining the hydrodynamic radius of the nano-object.

Rotational diffusion tends to average the nano-object directional shape, which may be advantageous as it means that there will be no specific particle orientation influencing the measured results. However, in order to estimate the particle asymmetry, measurements may either be acquired sufficiently fast to take a series of images of fixed orientations (which may be challenging in practical terms), or else quantities which are not averaged to zero upon particle rotation, such as the cross-circularly polarized intensity for circularly polarized illumination, which is background free, may be determined. In some examples, particle chirality can be measured using the average polarization rotation by the particle, which can be analysed in the same measurements using linearly polarized excitation, for example utilising an analyser or a polarization splitter inserted in the detection path.

To slow the movement of nano-objects, for example to prevent the nano-objects from moving too fast to allow simple tracking thereof, and/or from exiting an imaging frame between images, in some examples, the method may further comprise restricting the motion of nano-objects in suspension. This may comprise changing (for example, increasing) the viscosity of the carrier fluid, for example by changing the temperature thereof. For example, for some examples, cooling the carrier fluid may increase its viscosity. For example, a temperature may be controlled within a range of around 20 Kelvin, using a temperature control apparatus, such as a Peltier device.

In another example the viscosity may be controlled by adding a viscous agent to the carrier fluid, such as increasing the proportion of glycerol to water in a glycerol/water carrier fluid. In another example, the carrier fluid may comprise an electrorheological fluid, such as a gel. In such examples, the viscosity may be controlled by applying an electric field to the carrier fluid.

In other examples, electrophoresis may be utilised to pull nano-objects towards a surface, and the method may comprise measuring the nano-objects, and then repelling the measured nano-objects from the surface by applying an opposite electric field. Electrophoresis may have an additional function in that it may be used to measure the so-called zeta-potential of nano-objects in solution, which can assist in characterizing the nano-objects in some applications.

In some examples, the zeta potential of nano-objects may be determined at the same time as tracking nano-objects by applying an alternating field and analysing the corresponding frequency component of the nano-object motion during nano-object tracking.

In some examples, a functionalised surface (for example, comprising a chemical coating on a microscope coverslip) may be provided to temporally secure at least one nano-object, for example temporarily binding nano-objects to the surface, in some examples using a covalent bond. In addition, in some examples, a chemical which binds a specific nano-object type may be used, for example a chemical coating may be applied to the nano-object which selectively binds that specific nano-object type to the functionalised surface. As an example, a specific strong binding may comprise a protein-protein binding such as between biotin and streptavidin. For example, a surface may be functionalised with a streptavidin coating and a type of particle may be functionalised with biotin on its surface. As another example, a weaker binding which may be used to temporarily bind nano-objects to a surface is a DNA-DNA interaction or a weaker protein-protein interaction.

In some embodiments, the method comprises determining a two dimensional excitation and detection frequency spectrum to identify an elastic scattering contribution. In some such examples, the continuous variable spectral filter is a birefringent spectral filter.

This may allow for spectrally resolved excitation and detection, for example utilising a Fourier-transform technique with an optical path length variation, for example using a birefringent filter such as a birefringent crystal as the continuous variable spectral filter. In this way, a two-dimensional excitation (frequency $\omega_e$)—detection (frequency $\omega_d$) spectrum can be measured for each image pixel (x,y), along the nano-object trajectory for each nano-object.

This may be used to identify the elastic scattering contribution on the diagonal of the two-dimensional spectrum (i.e. the contribution when the excitation frequency=detection frequency; or $\omega_e=\omega_d$), which will therefore ignore the contribution of any fluorescence of the sample, which will appear off this diagonal. This additional information may provide a 'fingerprint' or signature of the nano-objects absorption and emission properties.

In some examples, the method may comprise applying a singular value decomposition (SVD) to the plurality of images to compensate for imaging apparatus parameter drift, for example through use of an SVD filter. Such a filter identifies the drift associated with an imaging apparatus and allows it to be removed from a captured image. This may increase sensitivity and allow nano-objects of smaller size to be imaged than would otherwise be possible.

In another aspect of the invention, an apparatus for analysis of nano-object attributes using wide-field transmission techniques is provided comprising:

an illumination apparatus comprising at least one light source to illuminate a sample comprising a plurality of nano-objects using bright field illumination;

a continuously variable spectral filter;

an imaging apparatus to acquire a plurality of images of the sample, wherein the position of the nano-objects within the sample changes between images; and a processing apparatus to determine, for each of a plurality of particles, a particle extinction cross-section.

The apparatus may further comprise a sample holder. The sample holder may be associated with at least one of: temperature control apparatus arranged to control the temperature of the sample (for example to control the viscosity thereof); a shifting mechanism which may be configured to reposition the sample relative to the imaging apparatus between images and/or an AC source, which may be arranged to subject the sample to an alternating electrical or magnetic field and a functionalised surface. In some examples, the AC source may also be used for carrying out electrophoresis or magnetophoresis.

In some examples, the imaging apparatus comprises at least two CMOS cameras, and/or may have a frame rate of at least 100 Hz. In some example, the apparatus may comprise an in-line birefringent spectral filter, for example comprising one or more optical wedges which may be repositioned relative to each other.

In some examples, the apparatus may comprise a sample dilution apparatus, which may for example be used to control a viscosity of the sample, or the nano-particle density.

In some examples, the illumination apparatus is arranged to illuminate the sample using polarization-resolved and spectrally-resolved dark field illumination and the processor is to determine a scattering cross-section.

In some examples, the processor may carry out at least one of the method steps described above.

BRIEF DESCRIPTION OF THE FIGURES

Embodiments of the invention are now described by way of example only with reference to the Figures, in which.

DETAILED DESCRIPTION

Figure 1:
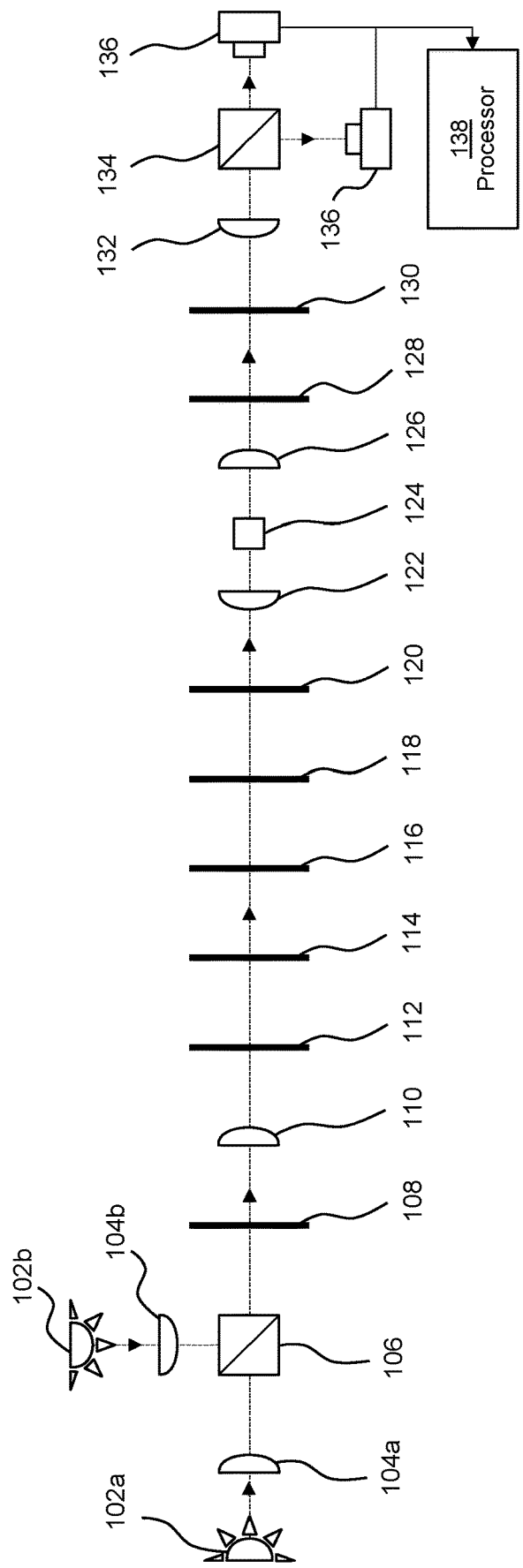
FIG. 1 is an example of an imaging apparatus according to one embodiment of the present invention.

FIG. 1 is an example of a system which may be utilised in one embodiment of the present invention.

In this example, an illumination apparatus comprises a first and second light source 102a, 102b, which may for example comprise LEDs. The light sources 102 provide light via respective collector lenses 104a, 104b to a beam combiner 106, which in this example comprises a dichroic beam combiner. Light is projected via a diaphragm 108 which controls the illumination area onto the sample, a lens 110 and a first polariser 112 before being passed to a continuously variable spectral filter 114.

The light sources 102 may cover the full range allowed by the optics, for example they may provide wavelengths from 300 nm to 1500 nm. In some examples the light sources may be LEDs which may have a bandwidth from 30 nm to 300 nm.

Figure 2:
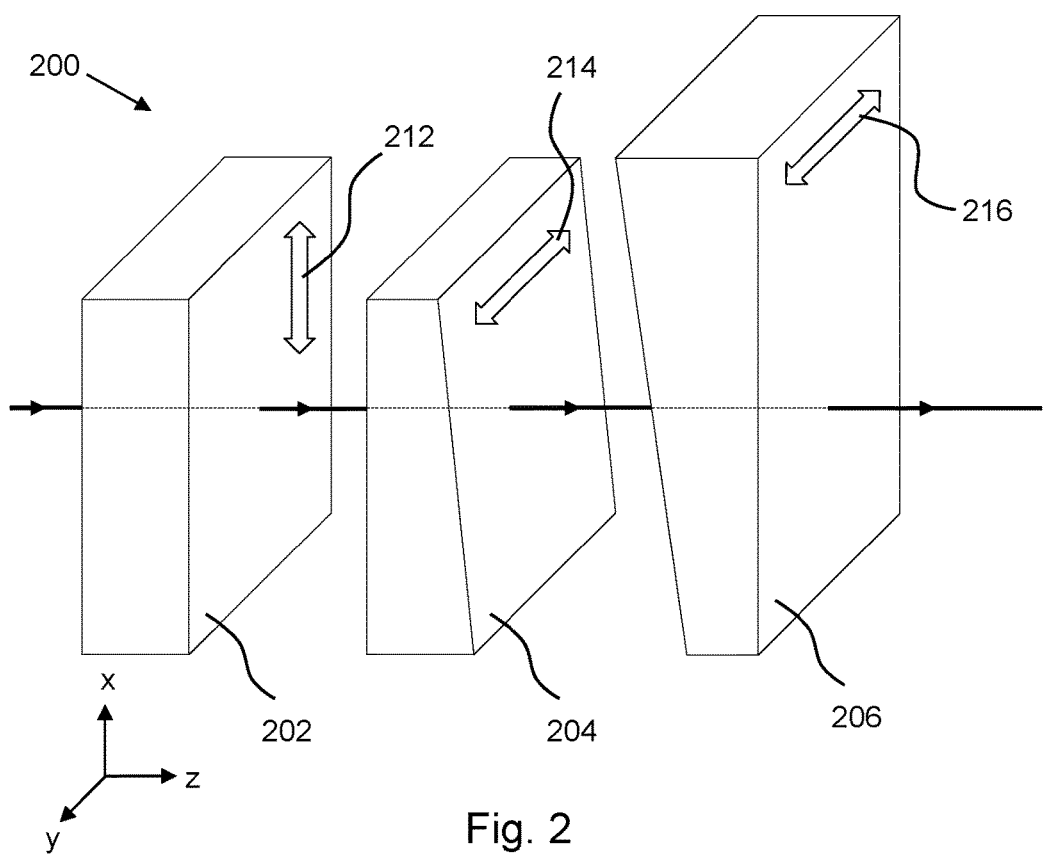
FIG. 2 is an example of a spectral filter.

FIG. 2 is an example of a continuously spectral filter 200 which may be utilised as the continuously spectral filter 114 in one embodiment of the present invention.

In this example, the spectral filter 200 comprises a birefringent spectral filter, for example comprising alpha-BBO (negative uniaxial $n_o$-$n_e$=0.075). The filter 200 comprises a number of wedges which may be positioned relative to one another to provide an intended optical delay. In this example, three elements are provided, a first 202 with parallel input and output faces (surface parallelism <5") and an optical axis 212 along x in xyz space, where z is the light propagation direction, a second 204 with a wedge along x and an optical axis 214 along y, and a third 206 also with a wedge along x with a wedge angle that may be around 6 degrees, and an optical axis 216 along y. The difference between the wedge angle of the second and third wedge is around or less than 5", and the optical axis orientation precision is around or less than 6'. The first and second elements 202, 204 are rigidly coupled, while the second and third 204, 206 are moveable relative to each other to tune an optical delay. The optical surfaces may for example comprise anti-reflective coatings, for example an MgF2 anti-reflection coating centred at 550 nm. Such a filter may provide a total range of around 10 mm in displacing the second and third element in x direction, and a 31 µm displacement may result in a change of the path length difference between x and y polarized light of one wavelength at 550 nm, resulting in a total range of around 330 wavelengths.

Such a filter 200 may tune the optical path length of two polarization states of light relative to each other, which may be utilised in processing the imaging data, as is further described below. In the described design the tuning range is about 0-181 µm delay. The filter 200 may be utilised to provide a Fourier transform interferometer.

Returning to FIG. 1, having passed through the filter 114, the light then passes through a second polariser 116, a first waveplate 118 (which may for example be a quarter wave plate or a half wave plate), an aperture stop 120 and a condenser lens 122 (for example an aplanatic condenser lens), at which point the light is incident on a sample 124.

Having passed through the sample 124, an imaging apparatus comprises an objective lens 126, an aperture stop 128, a second waveplate 130 (which may for example be a quarter wave plate or a half wave plate), a tube lens 132 and a polarisation splitter 134, which passes the light to at least two cameras 136, which may for example comprise CMOS cameras.

The apparatus further comprises a processor 138, which is to process the images acquired by the cameras 136, as is further described below.

It should be understood that this is just one example of an optical arrangement for obtaining images. In particular, the design of the filter 114 may be altered so comprise alternative optical parameters. There may be a continuously variable optical filter provided optically after the light has passed thought the sample 124 (which may functionally replace, or be provided in addition to, the continuously variable optical filter 114 described above).

In some examples, a sample may be diluted prior to imaging, for example so that each pixel is relatively unlikely to contain a nano-object at an instance, and/or that images of nano-objects are unlikely to overlap. For example, as is described in greater detail in relation to FIG. 7 below, a sample may be diluted with carrier fluids (such as water, glycerol, ethanol, isopropanol, or the like), according to density, solubility and intended diffusion speed, and pumped into sample chamber.

In some examples of the present invention, the sample is measured using polarization-resolved and spectrally-resolved bright field and dark field illumination, under an AC electric field. The apparatus may be reconfigured for bright field and dark field illumination are obtained by moving the aperture stops 120, 128 (which may for example be motorised and/or mounted on sliders or the like) for example in a 'Köhler' illumination configuration. In some examples, these the aperture stops 120, 128 may be mounted on a moveable support to facilitate switching between the two illumination modalities.

In some examples, the sample 124 comprises a suspension of nanoparticles, for example in a fluid chamber of a sample slide, as is discussed in greater detail in relation to FIGS. 3, 5 and 6 below. In other examples, the sample 124 may be mounted on a moveable platform, for example comprising a sample slide is mounted on a shifting mechanism, as is discussed in greater detail in relation to FIG. 7 below.

In use of the apparatus, a plurality of images may be acquired using the cameras 136, and the processor 138 may be configured to obtain at least one of the extinction cross-section, absorption cross-section, scattering cross-section, and depolarization cross-section as function of time. For example, the processor 138 may identify a nano-object within the sample in a plurality of images, wherein the position of the nano-object changes between images and determine, for the identified particle, using data extracted from the plurality of images, a particle extinction cross-section, and in some examples at least one of a scattering cross section and a depolarization cross-section. This may be repeated for each of plurality (in some examples, hundreds or even thousands of nano-objects) in order to characterise the samples as a whole. The determined cross-sections may be polarisation resolved due to the presence of the polarisers 112, 116 and the polarization splitter 134, although these components need not be provided in all examples.

To determine the cross-sections, the transmitted intensity is imaged over time using the cameras 136. Fourier transforms may be applied to the output of the cameras 136. The localized change in the transmission is determined using a time-averaged transmission in case of diffusion nano-objects, or in case of the shift method by taking two positions and referencing them to each other. Nano-objects are identified as localized changes in the transmission, and the cross-sections are determined by applying a local filter, for example averaging the intensity over a disk as described in [Appl. Phys. Lett. 102, 131107 (2013)]. Dielectric nano-objects without absorption will have a changing contrast depending on defocus, and can be analysed in a similar way, so that the method can determine scattering and absorption from a bright field transmission imaging alone. Using such apparatus 100 (and utilising the functionality of the polarisers 112, 116 and the polarization splitter 134) a depolarization cross-section may be determined referencing the intensity cross-polarized to the excitation (which is only present due to the nano-object), and may be measured by one of the cameras 136) to the co-polarized intensity (e.g. measured by another camera 136).

To briefly consider the Fourier transform imaging methods which may be employed with the described methods and apparatus, this may comprise acquiring a sequence of images versus displacement of the wedged prism 206 along x as described above. In an example, a displacement d corresponds to a time delay t which varies linearly varying in d. A Fourier transform may be applied to the resulting intensity versus delay t, $1(t)$, measured at each pixel of the image, to obtain the intensity spectrum $1(w)$ for that pixel. Using additional spectral band pass filters in excitation and detection, the spectral width can be limited and the delay step size required is inversely proportional to the spectral width. The spectral resolution Aw is inversely proportional to the number of delay steps used multiplied by the step size, the delay range.

Such Fourier transform imaging methods will be familiar to the skilled person, for example from OPTICS EXPRESS 12, 5368 (2004).

The extinction cross-section of a nano-object may be determined by spatially integrating the 'extinction' image obtained under bright field illumination at the nano-object position and the scattering cross section of a nano-object may be determined by spatially integrating the scattering image obtained under dark field illumination at the nano-object position.

In embodiments in which the nano-objects are suspended in a carrier fluid and move through a fluid chamber, an extinction and a scattering cross section may be determined as a function of time, and may be integrated along a tracked particle trajectory. Both cross-sections may be obtained by referencing to the illumination intensity measured in an empty position under bright field illumination. In the case of extinction cross-section, the contribution of light scattered forward into the detection path may be computed, and utilised to rescale the scattering cross section measured in dark field. Spectrally resolved absolute (i.e. quantitative) extinction and scattering cross-sections may be obtained, along with a spectrally resolved depolarization cross-section, using the spectral filter 114. An absorption cross-section may be obtained as extinction cross-section minus scattering cross-section. The measurements may be adjusted with predetermined parameters to take into account any difference in power between bright field and dark field illumination, which may arise because the nano-object has a different response to bright field and dark field direction ranges (i.e., polarization content) and only some fraction of the total scattering is collected (which may be different under bright field and dark field illumination).

Such parameters are expressed by analytical formulas for simple models of the nano-object polarizability and under the assumption the particle is small D<<A. The parameters describing the general case of a large nano-object (D-A) having a complex shape instead can be computed via suitable numerical modelling. The case of a particle in a homogeneous medium (corresponding to the particle in solution) and the case of a nano-object close to a dielectric interface (corresponding to a nano-object on a substrate) can both be treated either analytically or numerically.

Figure 3:
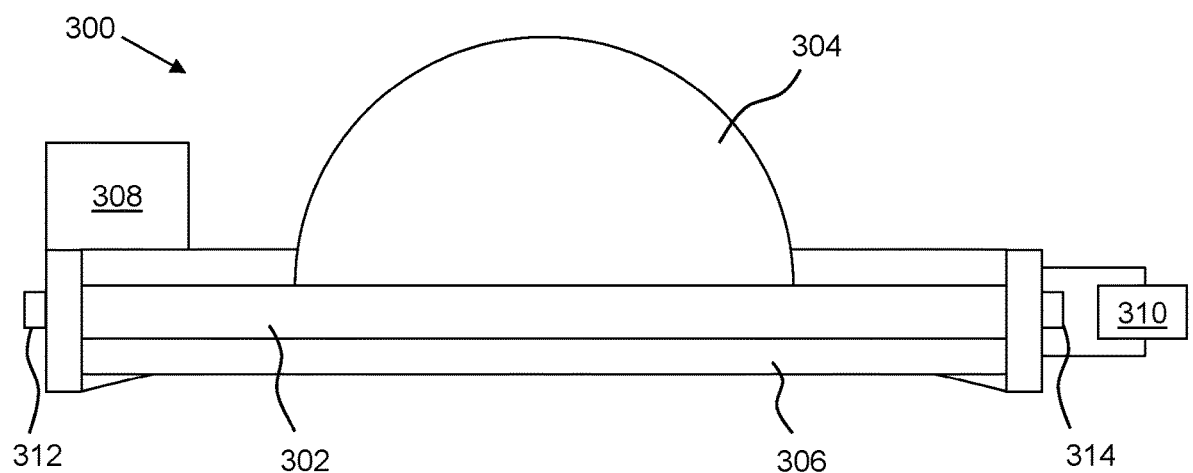
FIG. 3 is an example of a prepared sample slide.
Figure 5:
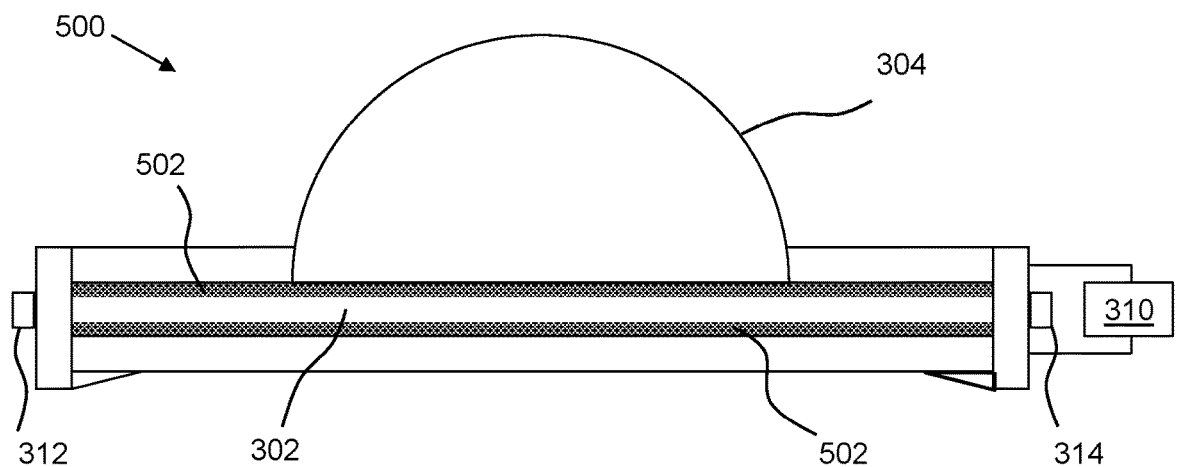
FIG. 5 is an example of a sample slide with a functionalised surface.
Figure 6:
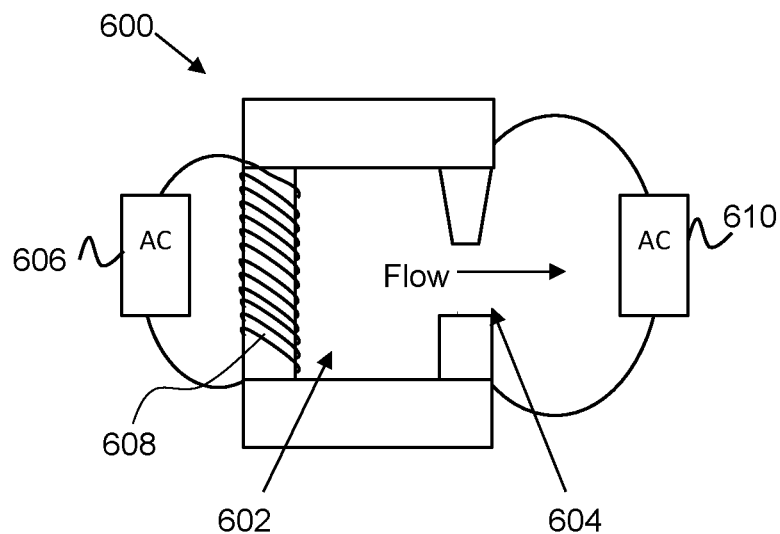
FIG. 6 is an example of a sample slide for exposing the sample to electric and magnetic fields.

At least one of a zeta potential, the magnetization and magnetic polarizability, and hydrodynamic radius may be determined from the nano-object tracking traces in some examples, for example where an alternating electric and/or magnetic field are provided (as shown in FIGS. 3, 5 and 6, discussed below). A depolarization cross-section may be modelled using analytical or numerical models (which might be tabulated in advance), and geometric parameters are deduced, such as size and shape. This may be based at least in part on a prior knowledge of nano-object types (e.g. materials, parametrized shapes) to be expected in the sample.

Furthermore, where provided, effects of the electric or magnetic fields on the nano-object orientation may be detectable in the particle anisotropy measured in terms of polarization resolved cross-sections. Therefore providing such fields allows a measurement of the nano-object magnetization, or the anisotropy of the electric nano-object polarizability.

In embodiments which utilise a birefringent filter such as the filter 200 described above, the filter may tune the optical path length of two polarization states of light relative to each other. Using polarizers before and after the wedge along the diagonal direction x+y, the two polarizations are made to interfere. Therefore, as discussed above, the intensity may be measured as function of path length difference, and performing a Fourier transform versus the path length provides the optical spectrum with a resolution of the inverse maximum delay (so about 60 wavenumbers (1/cm) in the example given above).

While other birefringent filters may be used, in the example filter 200 above, an in-line arrangement and the large gear factor of about 60 between wedge motion and path length allow for a passively stable interferometer with easily achievable mechanical accuracy requirements ($\lambda/10$ corresponds to about 3 μm motion).

The advantage compared to a tuneable spectral filter is a high throughput potential, and the spectral non-locality of the measurement, i.e. temporal fluctuations due to e.g. nano-object motion are distributed across the spectrum. Furthermore the spectral resolution can be adjusted continuously by changing the scan range, with higher resolution leading to an increase in measurable points.

In some examples, the images may be acquired through two continuously variable spectral filters to obtain a two dimensional excitation and detection frequency spectrum to separate inelastic and elastic scattering. One such filter could be placed between the illumination source and the sample, and a second filter could be arranged between the sample 124 and the cameras 136. In an example, a polariser 112 and a continuously variable spectral filter 114 could be inserted into the apparatus of FIG. 1 between the wave plate 130 and the lens 132 in such embodiments.

Whole images may be measured as function of delay, so that a sequence of images with different optical path length can be used to obtain a 3D (or 4D for excitation and detection filters) hyperspectral data cube.

Results may be determined on a single nano-object basis, and for example 100-10000 nano-objects may be measured within a single sample or multiple samples. The population of nano-objects may be characterised, for example providing counts (e.g. aggregated results which may be expressed in histograms and the like) of the measured parameters.

In some examples, a correlation between several observables may be visualized and analysed and/or a statistical analysis (for example using Principal component analysis (PCA) or clustering methods) of the observables may be performed to determine the independently varying quantities. In some examples, measured and modelled cross-section spectra of nano-objects are produced, and correlated with their zeta potential and hydrodynamic radius.

An SVD filter may compensate for measurement errors. Imaging apparatus such as CMOS cameras 136 can show slow drifts of its parameters such as gain and offset of each imaging pixel. Indeed this effect may be particularly apparent in CMOS cameras which have an individual amplifier (a MOS transistor) associated with each pixel, leading to pixel by pixel independently varying drift.

These drifts are typically small (<1%) and not relevant for general imaging applications. However, in the context of acquiring a high signal to noise images sufficient for the extinction cross section measurement, they can be significant.

SVD filtering is suitable to compensate for the drifts, since there are many more pixels (about 1e6) than slowly varying parameters (e.g. temperature, supply voltages and the like). Therefore, each independently varying parameter corresponds to a specific pixel pattern of gain/offset change, and the resulting patterns can be removed from the images.

In order to determine the patterns, a relatively long sequence of nominally constant images, i.e. without nano-objects may be obtained. For example, a plurality of images of an 'empty' pixel may be obtained. The imaging period may be longer than the typical fluctuation times of the parameters, for example up to around 10 minutes. The variations in these images may then be attributed to these patterns plus the random shot noise and read noise. Performing a singular value decomposition (SVD) of the time series identifies the independently fluctuating components, and identifies the patterns related to the slowly varying parameters. Apart from the singular value of each singular component, its spatial pattern may be used to identify components related to the pixel pattern, typically showing a striped appearance. Once the pattern has been identified, this can be used as the basis of a filter.

The pattern on the camera can also be suppressed by moving the particle relative to the cameras 136, therefore averaging the pattern at different positions. This would be always the case for nano-objects in solution, given by averaging along the particle diffusion path and, as is further noted below, in embodiments in which the nano-objects are fixed on a surface, they may be shifted to suppress the effect of the pattern to below 1 $nm^2$. Alternatively or additionally, moving the particle relative to the cameras 136 can also help reject any transmission inhomogeneity of the apparatus, effectively lowering the noise in an image and increasing the sensitivity.

The SVD filter may be provided by the processor 138. Alternatively or additionally, in other examples, the processor 138 may be configured to carry out filtering techniques such as noise filtering or background subtraction FIG. 3 shows an example of a prepared sample slide 300. In this example, the slide comprises fluid chamber 302 which may be around 100 µm thick. Illumination is received via a solid immersion lens 304 (for example, a fused silica lens having n=1.45 and being around 3-5 mm in diameter, and/or bearing an internal coating to ITO). The fluid chamber is enclosed by a cover slip 306, which may in some examples comprise an ITO coating on the internal surface.

In this embodiment, a Peltier temperature control device 308 is mounted on the slide and an alternating current (AC) source 310 is also provided to subject the sample to an alternating electromagnetic field.

In this example, the sample slide 300 is intended to receive particles suspended in a carrier fluid and to that end comprises a fluid inlet 312 on a first side thereof and a fluid outlet 314 on a second side thereof.

In some examples, the sample temperatures may be adjusted to control diffusion speed of the nano-objects through the carrier fluid using the temperature control device 308. The temperature may be based on, for example, the composition of the carrier fluid and the acquisition speed.

When measuring in solution (which has advantages in sample handling, since sample delivery, appropriate dilution, and sample removal, can be implemented by microfluidics), nano-objects show Brownian motion, and the nano-objects move in between images while the optical apparatus remains fixed. However rapid motion of the nano-objects may make them hard to track.

To control the diffusion speed of nano-objects, the temperature of the solution and the solvent can be adjusted. Using for example a 2:1 glycerol:water mixture, the dynamic viscosity at 20° C. is about 27 fold that of water, at 40° C. 10 fold, at 0° C. 94 fold, and at −10° C. 213 fold. These temperatures can be achieved with a simple temperature control device 308, in order to control the diffusion speed by, in some examples more than two orders of magnitude by adjusting the temperature. A higher viscosity will slow down the microfluidics operation (i.e. pumping the fluid in an out of the slide 300, and any dilution stages), but this may not be unduly limiting on the processing speed of the sample a whole.

For example, for spherical nano-objects of radius R and temperature T, displacement characterized by the root-mean square displacement (rms) after a time t may be as noted the following table (noting that $rms \propto sqrt(t/(R\eta))$).

| R (nm) | T(° C.) | rms (µm) | medium | η (Ns/m^2) | t (ms) |
|---|---|---|---|---|---|
| 1000 | 20 | 0.66 | water | 1e−3 | 1000 |
| 10 | 20 | 0.66 | water | 1e−3 | 10 |
| 10 | 20 | 0.3 | water | 1e−3 | 2 |
| 10 | 20 | 0.3 | 2:1 glycerol:water | 27e−3 | 56 |
| 10 | 40 | 0.3 | 2:1 glycerol:water | 10e−3 | 20 |
| 10 | 0 | 0.3 | 2:1 glycerol:water | 94e−3 | 188 |

Within the available viscosity, the diffusion of detectable particle sizes by the optical resolution (0.3 µm) can be controlled to be in the 10 ms time range or larger, longer than the frame acquisition times of typical CMOS cameras (0.1-10 ms).

Using an electric field induced motion, the electric field being applied by the alternating current (AC) source 310, the zeta potential can be determined using the hydrodynamic radius of the object and the fluid viscosity. The hydrodynamic radius may be calculated based on tracking a nano-object in three dimensions, determining a diffusion trace. The hydrodynamic radius may be determined using the diffusion constant extracted from the traces, the fluid viscosity, and the temperature, using the Stokes-Einstein equation.

By applying a sinusoidal electric field of a given frequency and amplitude using the alternating current (AC) source 310, and analysing the traces the amplitude and phase of the nano-object motion at the same frequency may be obtained. The amplitude can then be related via the Stokes drag law to the force, and dividing the force by the field amplitude provides the charge of the nano-object. From the charge of the particle, its hydrodynamic radius, and the Debye length of the fluid (which can be known and controlled by the fluid type), the zeta potential may be calculated.

Providing a sample carrier which comprises an input and an output means that sample may flow through the sample chamber (for example under the action of a pump of the like.

In the example of FIG. 3, a sample comprising nano-objects in suspension is considered. However, in another example, a sample may be dried onto a sample holder, e.g. by drop-casting on a coverslip and mounting on a suited microscope slide.

Figure 4:
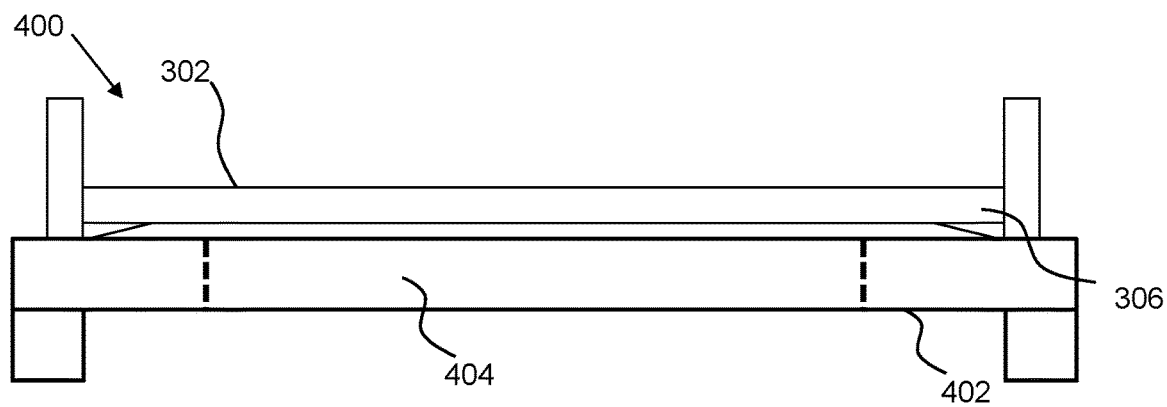
FIG. 4 is an example of a sample slide mounted on a shifting mechanism.

FIG. 4 shows an example of such an embodiment, in which components in common with FIG. 3 are labelled with like numbers. In the example sample holder of FIG. 4, a sample slide 400 is mounted on a shifting mechanism 402, in this example a piezo actuated sample stage comprising a large optical beam aperture 404. This implements a shift, for example using one lateral coordinate, say x, and repeats the measurements at different positions.

In examples which utilise such a sample slide 400, the sample may be shifted between images. This allows the sample to be measured using polarization and spectrally resolved bright field and dark field illumination, resulting in extinction cross-section, scattering cross-section, and depolarization cross-section, and as function of the linear polarization of excitation and detection. The imaging data may be analysed in the same manner as for sample comprising carrier fluid.

FIG. 5 shows an example of a sample holder 500, in which components in common with FIG. 3 are labelled with like numbers. The sample holder 500 comprises a functionalised surface 502, such as a weak covalent binding, for example a glass surface with amine groups, or a biochemical protein-protein or DNA-DNA hybridization binding.

It may be noted that, in the example discussed above in relation to FIG. 3 (see also FIG. 6 below), an alternating field was applied to allow particle tracks to be analysed in conjunction with the alternating field to extract the field related motion.

In this example, the electric field provides an alternative or additional functionality: The electric field may pull nano-objects to a surface, and the nano objects may be released therefrom removing the field or reversing its polarity.

Such a method may hold particles in a static state, and/or induce movement so that a random drift of the nano-objects is not relied upon.

FIG. 6 shows an example of a sample holder 600 which is configured to allow the measurement of a zeta potential, a hydrodynamics radius (using the random diffusion), and the magnetization and/or magnetic polarizability (using a modulated magnetic field induced drift) of a nano object.

The sample holder 600 comprises a chamber 602 having a relatively narrow channel 604 across which an alternating magnetic field may be provided by a first alternating current source 606 which provides a current to a winding 608 so as to provide an alternating magnetic field through the channel. An alternating electric field may be provided by a second alternating current source 610. The optical axis in this example is out of the page (i.e. perpendicular to the plane of the Figure).

The magnetization and the magnetic polarizability can be determined using a magnetic field induced motion, the hydrodynamic radius, and the fluid viscosity. By applying a sinusoidal magnetic field gradient of a given frequency and amplitude, and analysing the traces the amplitude and phase of the nano-object motion at the same frequency may be obtained. The amplitude can then be related via the Stokes drag law to the force, and dividing the force by the field gradient amplitude provides the magnetic dipole moment of the nano-object.

Figure 7:
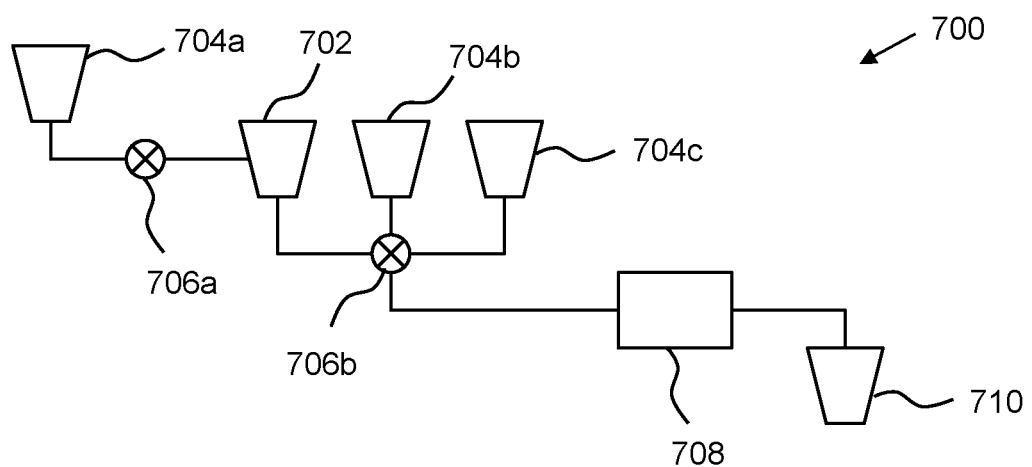
FIG. 7 is an example of a sample dilution apparatus.

FIG. 7 shows an example of sample dilution apparatus 700. A sample may be provided to a sample inlet 702. One or more solvents may be provided at fluid inlets 704. In this example a first solvent is provided to the first solvent inlet 704a. A first pump 706a pumps the solvent to the sample inlet 702. The pump also controls the flow rate and mixing of the sample with the first solvent. In this example a further two solvents are provided at the second and third solvent inlets 704b, 704c. In some examples more solvents may be mixed, or fewer solvents may be mixed. In this example the sample is mixed with the second and third solvent at the second pump 706b, where the mixing and flow of the mixture to a fluid chamber 708 (for example the fluid chamber 302, 602) is controlled. After the mixture has passed through the fluid chamber it is routed to a waste 710 where it may be recycled, disposed of or used for further analysis, or if the apparatus is used for in-line measurement the output may be routed to further production or packaging steps.

The determinable or measurable nano-object size range using the method and apparatus described herein may depend on the material. Generally, absorptive materials such as metals, semimetals, or semiconductors can be detected more sensitively due to their stronger contrast in susceptibility to the medium, and the presence of absorption. Specifically the plasmonic resonance for metal nano-objects effectively enhances the cross-sections for a given size.

For example, spherical gold and silver nano-objects, sizes down to 2 nm may be measurable using the apparatus and techniques described herein. Dielectric particles of small index contrast to the carrier fluid (say 0.15, typical for organic materials in water) are harder to detect and to discriminate from other residuals in solution/sample surface. Their scattering cross-section is about 300 nm$^2$ for 100 nm particle size, and the methods and apparatus described herein may be utilised to detect nano-objects of this type of around 20 nm or larger.

Objects larger than the optical resolution can be imaged directly in size and shape, so that the apparatus would be capable to cover the size range up to at least 10 μm.

The analysis may be used to determine size and/or shape of the nano-objects. This may be done for a large number of nano-objects at once. This may comprise matching a detected light signal to a dataset of model light signals In an example, one sample may be processed in around 5 minutes of which about 3 minutes may comprise measurement time. Around 1000 individual nano-objects may be tracked during this time. This number can be increased by longer measurement times (for example, by exploiting the passive particle diffusion in and out of focus, and by actively flowing the medium stepwise to exchange the measured particle volume laterally). In addition, this is based on current CMOS frame rates and illumination sources and processing times may be reduced given advancements in such apparatus.

For very small nano-objects, measurement times may be increased as in general a greater number of images will be required to identify them (this may also imply a higher viscosity of the medium or otherwise reduced diffusion speed.)

Interpreting the measured spectrally resolved cross-sections in terms of nano-object size, shape, and material is an inverse problem and can require a significant amount of processing resource due to the involved computational effort. In some examples, pre-computed spectra for a range of possible nano-object properties may be provided, which then have only to be compared with the measured spectra to find the best match, which may reduce the processing resources required.

In some examples, nano-object and/or solutions may fluoresce and/or solutions may be less than perfectly transparent. Fluorescence is less of a problem for transmission techniques than some other nano-object characterisation techniques for example techniques detecting scattering only, such as dark field. However, it may be the case that a spectral image of each pixel is obtained. This can be used to isolate the region of the spectra which provides useful information and/or to learn more about the nano-objects. The spectral images may be determined using Fourier transform birefringent techniques.

Fluorescence may be an issue when measuring the scattering of nano-objects as it can have a similar or even dominating intensity, such as for e.g. fluorescently doped polymer beads or colloidal semiconductor quantum dots. Fluorescence, as opposed to elastic scattering, has a non-zero frequency shift between incident and scattered light. By implementing spectrally resolved excitation and detection, using a Fourier-transform technique with a birefringent spectral filter, a two-dimensional excitation (frequency $\omega_e$)—detection (frequency $\omega_d$) spectrum can be measured for each pixel (x,y), which may be analysed along the nano-object trajectory for each nano-object. This will identify the elastic scattering contribution on the diagonal of the two-dimensional spectrum ($\omega_e=\omega_d$), while fluorescence will be seen off diagonal. This additional information can be very instructive for nano-object characterization also, as this 2D spectrum gives a fingerprint of the nano-objects absorption/emission properties.

While the method, apparatus and related aspects have been described with reference to certain examples, various modifications, changes, omissions, and substitutions can be made. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example. For example, features described in relation to one of FIGS. 3 to 6 may be combined with features from another of FIGS. 3 to 6.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method of analysis of nano-objects using wide-field bright field transmission techniques comprising:
    acquiring a plurality of images of a sample comprising a plurality of nano-objects using bright field illumination via a continuously variable spectral filter;
    identifying a nano-object within the sample in the plurality of images, wherein the position of the nano-object changes between images;
    quantitatively determining, using data extracted from the plurality of images, an extinction cross-section of the identified nano-object.

2. A method according to claim 1 further comprising:
    imaging scattered radiation using to dark field imaging techniques; and
    determining a scattering cross-section.

3. A method according to claim 1 in which the illumination and/or acquisition of images is polarisation-resolved and wherein the method further comprises determining, quantitatively, for the identified nano-object, using data extracted from the plurality of images, a polarisation-resolved extinction and/or scattering cross-section.

4. A method according to claim 1 in which the illumination and acquisition of images is polarisation-resolved and the method further comprises determining a polarisation-resolved depolarisation cross-section.

5. A method according to claim 1 further comprising comparing the determined cross-section to at least one predetermined model to identify a size of a nano-object within the sample.

6. A method according to claim 1 further comprising:
    determining an optical anisotropy of nano-objects based on the dependence of the cross-sections on the polarization of the illumination and/or the polarization of the acquired images.

7. A method according to claim 6 further comprising comparing the determined anisotropy to at least one predetermined shape model to identify a shape of a nano-object within the sample.

8. A method according to claim 1 in which the nano-objects are in suspension in a carrier fluid and the method further comprising restricting the motion of the nano-objects.

9. A method according to claim 8 comprising changing a viscosity of the carrier fluid.

10. A method according to claim 9 comprising at least one of (i) cooling the sample to change the viscosity and (ii) adding a viscous agent to the carrier fluid.

11. A method according to claim 8 comprising applying electrophoresis to pull nano-objects towards the surface, measuring the nano-objects and repelling the measured nano-objects from the surface by applying an opposite electric field.

12. A method according to claim 8 comprising providing a functionalised surface to temporarily secure at least one nano-object.

13. A method according to claim 8 further analysing nano-object traces in response to a modulated external field.

14. A method according to claim 13 comprising applying a modulated electric field to the sample, the method further comprising determining at least one of a nano-object zeta potential and a nano-object anisotropic polarizability.

15. A method according to claim 13 comprising applying a modulated magnetic field to the sample, the method further comprising determining at least one of a nano-object magnetization, a nano-object magnetic polarizability and nano-object anisotropic magnetic polarizability.

16. A method according to claim 1 in which the nano-objects are immobilized on a substrate and the method further comprises moving the substrate relative to imaging apparatus to acquire the plurality of images.

17. A method according to claim 1 further comprising acquiring the images through two continuously variable spectral filters to obtain a two dimensional excitation and detection frequency spectrum to separate inelastic and elastic scattering.

18. A method according to claim 1 further comprising applying a singular value decomposition to the plurality of images to compensate for imaging apparatus parameter drift.

19. Apparatus for analysis of nano-object attributes using wide-field bright field transmission techniques comprising:
   illumination apparatus comprising at least one light source to illuminate a sample comprising a plurality of nano-objects using bright field illumination;
   a continuously variable spectral filter;
   imaging apparatus to acquire a plurality of images of the sample using the bright field illumination via the continuously variable spectral filter, wherein the position of the nano-objects within the sample changes between images; and
   processing apparatus to determine, for each of a plurality of nano-objects, an extinction cross-section.

20. Apparatus according to claim 19 further comprising a sample holder, the sample holder being associated with at least one of:
   a temperature control apparatus arranged to control the temperature of the sample;
   a shifting mechanism arranged to reposition the sample relative to the imaging apparatus between images;
   an AC source arranged to subject the sample to at least one of an alternating electrical field;
   an alternating magnetic field source; or
   a functionalised surface.

21. Apparatus according to claim 19 in which the imaging apparatus comprises at least one CMOS camera.

22. Apparatus according to claim 19 in which the imaging apparatus has a frame rate of at least 100 Hz.

23. Apparatus according to claim 19 wherein the continuously variable spectral filter comprises an in-line birefringent spectral filter.

24. Apparatus according to claim 23 in which the birefringent spectral filter comprises relatively positionable optical wedges.

25. Apparatus according to claim 19 comprising a sample dilution apparatus.

26. Apparatus according to claim 19 wherein a processor is arranged to apply an SVD filter to the images.

27. Apparatus according to claim 26 wherein the illumination apparatus is arranged to illuminate the sample using polarization-resolved and spectrally-resolved dark field illumination and the processor is to determine a scattering cross-section.

* * * * *